United States Patent [19]

Goldstein et al.

[11] 4,113,921
[45] Sep. 12, 1978

[54] SECONDARY CELLS

[76] Inventors: Jonathan R. Goldstein, 51 Hashachal St.; Yitzhak Klein, 1 Chatam Sofer St., both of Jerusalem, Israel

[21] Appl. No.: 812,672

[22] Filed: Jul. 5, 1977

[30] Foreign Application Priority Data

Jul. 12, 1976 [IL] Israel .................................. 50024

[51] Int. Cl.$^2$ .......................................... H01M 10/34
[52] U.S. Cl. ....................................... 429/27; 429/58; 429/219; 429/223; 429/224; 429/229
[58] Field of Search ..................... 429/58, 57, 59, 66, 429/229, 231, 219, 223, 224, 27, 40, 44

[56] References Cited

U.S. PATENT DOCUMENTS

| 3,080,440 | 3/1963 | Ruetschi et al. ...................... 429/59 |
| 3,876,470 | 4/1975 | McBreen ............................ 429/229 |
| 4,041,221 | 8/1977 | Berchielli et al. ................ 429/231 X |

*Primary Examiner*—Anthony Skapars
*Attorney, Agent, or Firm*—Fleit & Jacobson

[57] ABSTRACT

The invention relates to a secondary cell having zinc electrodes in which there is provided an auxiliary electrode having a surface of electrocatalyst having a low overvoltage for hydrogen evolution, which is resistant to deposition of zinc thereon, means for connecting said auxiliary electrode to the negative electrodes during charging, the arrangement being such that the auxiliary electrode takes up the excessive current at the negative electrodes over that of the positive ones, thus eliminating or substantially reducing shape-change phenomena of the negative electrodes. It further relates to a Ni-Zn cell of the minimum electrolyte type having teflonized -ZnO electrodes, wherein there is provided a U-shaped electrocatalytically active auxiliary electrode in the shape of a bent-over ribbon of suitable catalytically active surface, positioned adjacent to the edges of the lower end of the plates of the cell and its lateral sides and a further rectangular similar material adjacent to the upper edge of the plates of the cell, said auxiliary electrode being separated from the edges of the plates by a suitable pervious insulator, said auxiliary electrode being adapted to be connected with the zinc plates during the charges, the arrangement being such that the auxiliary takes up about 5 to 10 per cent of the current during charging.

11 Claims, 2 Drawing Figures

SECONDARY CELLS

FIELD OF THE INVENTION:

The present invention relates to improvements in secondary batteries of the alkaline type, having a zinc electrode. Amongst cells of this type there may be mentioned Ni-Zn; Ag-Zn, $MnO_2$-Zn, $Zn-O_2$ and Zn-air, respectively. Zinc has a number of important advantages over competitive metals, such as low weight, low cost, comparatively high power and voltage levels. Thus, secondary batteries having a zinc electrode as one of the two electrodes show promise for superior energy and power density characteristics over the conventional lead-acid batteries.

The invention relates to improved batteries of the alkaline type, wherein one of the two electrodes is a zinc electrode. According to the present invention means are provided for substantially eliminating the problem of shape-change failure. The means according to the present invention comprises an auxiliary electrode of specific configuration and characteristics connected to the zinc electrodes during the charging, which prevents shape-change phenomena, resulting in an increased deep cycle life at sustained capacity levels.

STATE OF THE PRIOR ART:

Investigations of lower cost high performance secondary batteries have emphasized the nickel/zinc system. This electrochemical system possesses a unique combination of performance characteristics in comparison to its silver and cadmium analogs. It is capable of high rates of charge and discharge, has an energy density of 70 Whr/Kg or better, a flat voltage curve during discharge and can be stored for long periods in the wet discharged state. Four electrochemical systems can be made from nickel, silver, zinc and cadmium, namely, Ni/Zn; Ni/Cd; Ag/Zn and Ag/Cd. Ni-Zn secondary cells were described as far back as 1899 and were used experimentally in 1930 as a railway battery. Cells described in Russia about 1950 used limited quantities of electrolyte as in Ag/Zn cells, resulting in a greatly reduced rate of dissolution of the zinc plate. A survey of Ni-Zn batteries was presented at the Eight and Ninth International Power Sources Conferences, Brighton (UK), 1972 and 1974 respectively.

A cycle life of up to about 200 cycles was reported for Ni-Zn cells at a depth of discharge of about 50% for vented cells and at a depth of discharge of 100% for sealed cells. After about 200 cycles, however, cell capacities had fallen to below half their initial value. At these conferences a very detailed survey was given of the state of the art of this and of similar types of secondary batteries.

Benczur-Uermoessy et al of Deutsche Automobilgesellschaft reported at the 1974 conference on the development of a rechargeable nickel-zinc cell with an auxiliary electrode. Their development relates to a nickel-zinc cell with soluble zinc anodes and an auxiliary electrode which it is alleged overcomes the problems of dendrite formation and of shape-change. The auxiliary electrode acts as a dendrite barrier during charge and prevents shape-change by dissolution of residual zinc after discharge. A claim was made for a cell of over 1200 charge/discharge cycles at maintained capacity for a 4 Ahr cell which at the 1 hr discharge rate delivered about 30 to 40 Whr/Kg. The auxiliary electrode consists of a nickel mesh the surface of which is covered with an electrocatalyst for hydrogen evolution. It is situated between the positive and negative electrodes of the cell extending beneath the zinc electrodes of the said cell and is provided with a separate current lead. The zinc electrode is described as being of the "first kind", i.e. sufficient electrolyte is provided to keep substantially all zinc ions in solution as zincate. During charge zinc metal was plated out onto the negative baseplate from the alkaline zincate solution and zinc dendrites growing in the direction of the positive electrode would encounter the mesh where they would be dissolved. According to the design of this cell the auxiliary is not connected to the negative electrode at this stage. In order to adequately charge the positive electrode the zinc electrode had to be overcharged and thus excess zinc is deposited, which remains unused on the negative electrode at the end of the discharge and which tends to build up at the bottom and edges of the zinc electrodes, resulting in a fall of the capacity of the call. Only after complete discharge of the cell, a reconditioning step was resorted to, by shorting the auxiliary electrode to the negative electrode, until the built up zinc is completely removed. This was necessary after every cycle. The reconditioning is effected only on completely discharged cells, during a period of about 30 minutes. The rapid reconditioning implied a high rate of hydrogen evolution, it was not applicable to partially discharged cells. Furthermore, electrode distances are quite big (about 5 mm) and this implies lower power and higher weight. Limited electrolyte ZnO electrodes cannot be used in this known construction. A further serious drawback of this cell is its high rate of self-discharge, namely about 18 percent in 60 hours. With limited electrolyte ZnO electrodes self-discharge can be as low as 2 percent during this period.

SUMMARY OF THE PRESENT INVENTION:

The present invention relates to auxiliary electrodes incorporated in secondary cells which have zinc electrodes, said auxiliary electrodes being adapted to prevent shape-change problems. The auxiliary electrode is connected during the charging of the cell and can be effectively used with minimum-electrolyte ZnO electrodes.

The invention is illustrated with reference to nickel-zinc and silver-zinc type, but it ought to be understood that these are by way of illustration only and that the invention is also applicable to the other secondary cells having a zinc electrode.

According to the present invention there is provided an auxiliary electrode, adapted to be connected during the charging of the secondary cell, said auxiliary being adapted to result in the elimination of shape-change problems.

According to one specific embodiment, the auxiliary electrode is provided in a limited electrolyte Zn/ZnO negative electrode type Ni-Zn cell, said electrode being either provided at a small distance from the edges of the electrodes and perpendicular to the plane of these; according to a further embodiment of the invention, the electrode is provided between the conventional electrodes, said auxiliary being ensheathed in a microporous separator.

When the first embodiment is resorted to, the auxiliary electrode has the configuration of a rectangular sheet, bent in U-form and which surrounds the lateral and lower edge of the electrodes, at a certain distance from the edge of the conventional electrodes and substantially perpendicular to these, there being advantageously provided a further rectangular strip at the top of the cell, also a certain distance from the edges of the electrodes and perpendicular to these.

According to another embodiment of the invention a mesh-type auxiliary electrode is interposed between the conventional electrodes this auxiliary being surrounded in a microporous envelope.

The auxiliary electrodes are connected during the charging of the cell and they are adapted to take up about 10 percent of the current or less, this being adequate to prevent the shape-change phenomena.

When the first embodiment is used, i.e. a strip-formed auxiliary perpendicular to the edges of the electrodes, the cells are of conventional construction and contain conventional separators. Minimum electrolyte cells of the Zn/ZnO type can be equipped with such auxiliary electrodes and an area of about 10 percent of that of the total zinc electrode area is adequate, the preferred area of the auxiliary being about 5 percent of this total area. The auxiliary electrode supports a catalyst for hydrogen evolution and has a low overvoltage for this hydrogen evolution. The cells are preferably provided with means for the recombination of hydrogen and oxygen to water, thus providing minimum maintenance cells. The auxiliary is connected during the charging of the cell with the conventional zinc electrode and the auxiliary is positioned in the same electrolyte as these.

The nature of the electrocatalyst is not critical and any suitable electrocatalyst for hydrogen evolution can be used. According to one preferred embodiment of the first embodiment of the invention (the perpendicular auxiliary) this auxiliary electrode comprises a porous nickel sinter support of about 0.5 mm thickness, sandwiching between two layers thereof a suitable electrocatalyst powder substantially free of noble metals, having the required low overvoltage for hydrogen evolution and being highly resistant to zinc deposition thereon. A suitable electrocatalyst is nickel boride produced by reduction of nickel chloride by sodium borohydride or by another reaction. An alternative electrocatalyst powder is iron carbide, prepared by the reduction of magnetite with carbon black. It may be produced from a mixture of 4 parts by weight of magnetite to 1 part by weight carbon black which is heated at 800° C. for an hour. A further embodiment of the electrode comprises simple metal foil or mesh serving as support of said nickel plated steel, for example, the surface of said support being activated by conversion to electrocatalytically active materials, such as transition metal spinel oxides. For example, the metal support may be plated with a transition metal alloy such as Ni/Co or Co/Fe in 1:2 molar ratio and this may be heat treated at about 400° C. to 900° C. during about 15 minutes in air, resulting in the desired catalytically active surface.

Excellent results were obtained with porous nickel electrodes having a nickel boride powder content of about 10 to 20 mg/cm$^2$. Electrodes of this type, constituting less than about 5 percent of the weight of the cell, which deliver about 10 percent of the current during the charging of the cell, have been operated over 500 charge/discharge cycles without appreciable loss of stability or activity of the auxiliary electrode or appreciable loss of capacity of the cell.

The 10 percent of current, or comparative lower percentage, is based on the finding that for conventional positive electrodes in such cells, with DC or pulsed charging modes, varying from float/trickle and up to the 1-hour-rate, the positive charging efficiency is lower than that of the negative by a maximum of 10 percent over the entire charging period. The percentage of current taken by the auxiliary has to be varied so as to compensate the charging inequality.

As shape-change buildup is most pronounced at the bottom end of the electrodes and along their edges, the positioning of the auxiliary electrode in the vicinity of these is the most effective one.

The second embodiment of the auxiliary electrode according to the present invention is in the form of a rather coarse mesh of metal (about 10 mesh) with suitable electrocatalyst applied to the surface thereof, the mesh being inserted between the conventional electrodes of secondary cells having one zinc electrode, such as Ni-Zn or Ag-Zn secondary cells. In this case the mesh ought to be surrounded by a microporous insulating material, such as microporous polypropylene or the like. This arrangement can be employed with minimum electrolyte secondary cells wherein the electrodes are close to each other, i.e. at a distance of less than about 2 mm and even 1 mm. This is to be contrasted with the distance of 5 mm stipulated for the above German development.

As pointed out above, the auxiliary electrode in both embodiments is connected during the period of time when the cell is charged and this applies also to the charging of a partially discharged cell. Stirring of the electrolyte during charging, by hydrogen evolved, results in excellent charge characteristics. During discharge the auxiliary electrode need not be connected and it may be disconnected by suitable electronic means or by a simple switch. The auxiliary is also advantageously disconnected when the charged cell is stored. The use of a conventional recombination plug results in the combination of hydrogen evolved and of oxygen to form water. The low weight of the auxiliary in the first embodiment has been referred to. As to the second, the mesh is thin-stranded and open; the auxiliary electrode has a small weight and is quite thin, thus making possible its incorporation in cells of conventional dimensions including those of the Ni-Zn type employing teflonized ZnO electrodes.

As pointed out above, any suitable electrocatalyst for the evolution of hydrogen, which has a suitable low overvoltage, can be used. This applies even to catalytically active platinum. The following examples exemplify some of the possible configurations of the auxiliary electrodes according to the present invention and the use of some electrocatalysts. It ought to be clearly understood that the examples are given in an illustrative manner and that there are not to be construed in a limitative way.

The invention is exemplified with reference to the following examples and with the aid of the enclosed drawings, which are schematical ones and which are not according to scale.

Figure 1:
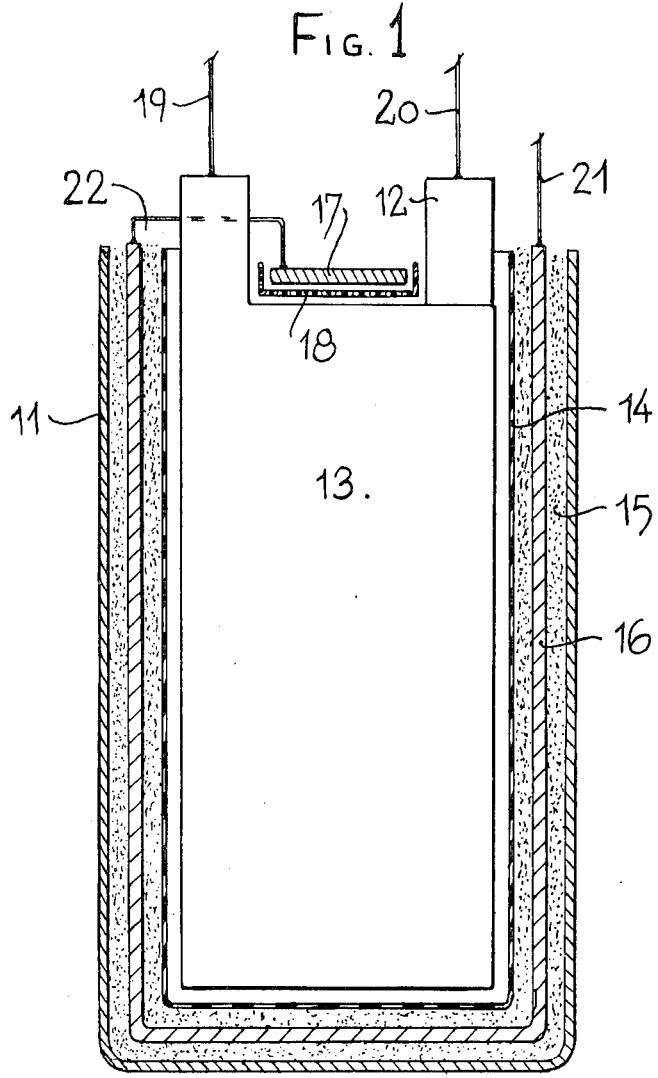
FIG. 1 is a schematical sectional side view, not according to scale, through a cell according to the invention.

As shown in the Figures, the cell consists of a housing 11, wherein there are arranged in an alternating sequence zinc plates 12 and nickel plates 13, said nickel plates being enclosed in separator envelopes 14, preventing the formation of dendrites. The size of each plate is about 70 to 150 mm and the electrodes are spaced about 1 mm apart. The cell is filled with electrolyte 15. There is provided an auxiliary electrode consisting of a U-shaped member 16 arranged a short distance from the lower and lateral edges of the plates and perpendicular to these and a rectangular member 17 arranged near the upper edge of the plates, a short distance from these and perpendicular to the said plates. These are connected by lead 22. During charging of the cell, the auxiliary electrode is connected to the zinc plates which are in parallel. A plastic mesh spacer 18 is provided between the auxiliary electrode and the said plates of the cell to prevent a shorting of the cell. There are provided leads 19, leading to the outside of the cell, lead 21 being that of the auxiliary electrode.

DESCRIPTION OF THE PREFERRED EMBODIMENTS

The invention relates to novel secondary cells of the type having zinc electrodes, such as Ni-Zn; Ag-Zn; $MnO_2$-Zn; Zn-$O_2$ and Zn-air type wherein there is provided an auxiliary electrode, adapted to be connected with the negative electrode during the charging of the cell, said auxiliary having a low overvoltage for hydrogen evolution, said auxiliary being highly resistant to deposition of zinc, said auxiliary being adapted to provide a current compensating for the excess of charging efficiency of the negative electrodes over that of the positive ones, thus preventing shape-change effects of the negative electrodes. According to a preferred embodiment means are provided to disconnect the auxiliary electrode or electrodes during storage or during discharge of the cells.

The invention is illustrated with reference to Ni-Zn and Ag-Zn type secondary cells, but it is clearly understood that it is also applicable in a similar manner to the other types of secondary cells having zinc electrodes.

Auxiliary electrodes of various types can be used. They must have the above defined characteristics as regards electrocatalyst properties, resistance to zinc-plating and storage stability.

One type of electrode was produced from nickel sinter of about 0.5 mm thickness of about 1 cm × 10 cm size. Two layers were taken with 10 to 20 mg/cm$^2$ nickel boride being provided in an even layer between these. The nickel boride powder was prepared by reducing nickel chloride solution with sodium borohydride according to Paul et al., Ind. Eng. Chem. 44 (1952) 1006. Hydrogen overvoltage characteristics at 25° C. were measured by placing the auxiliary at a distance of 5 mm from a large active zinc electrode in a 30-wt-% potassium hydroxide solution saturated with zincate. When the electrodes were connected with each other the auxiliary delivered 20 mA/cm$^2$ at a +200 mV potential with respect to the zinc which shows the low hydrogen overvoltage. The zinc electrode was then replaced by a nickel sheet and electrolysis was carried out with the nickel as anode and the auxiliary cathode. Currents of up to 50 mA/cm$^2$ could be passed and the auxiliary evolved only hydrogen and no zinc plating took place. The performance of the auxiliary as regards hydrogen evolution remained stable with time.

According to another embodiment the metal foil constituting the auxiliary electrode was a metal foil plated with a transition metal alloy and subjected to heat treatment. Foils of 0.1 mm thick nickel were provided with a layer of nickel-cobalt or cobalt-iron alloy (molar ratio of 1:2) by conventional electroplating from aqueous solution, the plated alloy being of 5 to 10 mg/cm$^2$. The foil was heat-treated at 800° C., 15 minutes, in air, thus converting the surface to electroactive spinel oxide. The thus obtained foil showed similar characteristics as regards hydrogen evolution, resistance to zinc deposition and stability as that based on nickel boride powder. It was tested with a zinc electrode and a 10 cm$^2$ foil delivered 10mA/cm$^2$ at +200 mV against zinc. It withstood prolonged hydrogen evolution without deposition of zinc from alkaline zincate solutions at currents up to 40 mA/cm$^2$.

Figure 2:
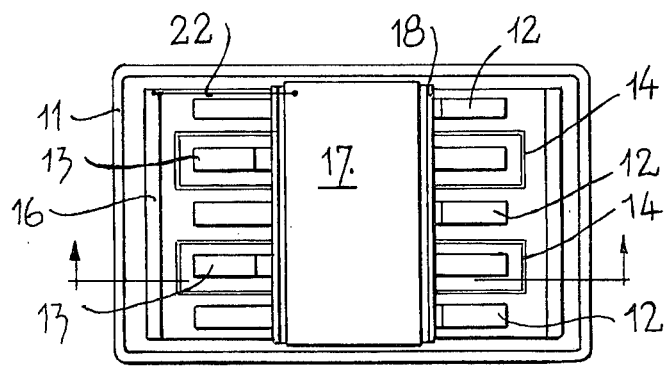
FIG. 2 is a top view of the same cell.

EXAMPLE 1:

A cell of the type illustrated in FIGS. 1 and 2 was constructed from 3 negative zinc electrodes of 15 × 7 cm, 1 mm thick of the teflonized zinc type and 2 positive nickel electrodes, positioned between these of 1 mm thickness of the sintered type of the same size. These were spaced 0.5 mm apart and the positive electrodes were inserted in a separator of the conventional type to prevent formation of dendrites. The electrolyte consisted of 30% KOH containing 1% lithium hydroxide and a quantity of 50 ml electrolyte was used. The volume of the cell was 150 ml and its weight 220 g. The auxiliary electrode consisted of a strip of porous nickel with a layer of 15 mg/cm$^2$ nickel boride between 2 such layers, which was bent in U-shaped form and a further section of rectangular shape. The dimensions of the two sections of the auxiliary electrode were 41 × 0.9 cm and 4 × 0.9 cm respectively. The U-shaped section was positioned close to the lower and lateral sides of the edges of the electrodes of the cell and the rectangular section close to the upper edges of the electrodes. The auxiliary was at a distance of about 4 mm from said edges. The total area of the zinc electrodes was 630 cm$^2$ and that of the auxiliary electrodes 40 cm$^2$. The auxiliary electrode weighed 10 g. The auxiliary electrode is connected by an external lead to the negative electrodes while the cell is being charged, the connection being via a resistor of 3 ohms and through a circuit allowing a current of 120 mA during the charge between the auxiliary and the negative electrodes. The auxiliary is advantageously disconnected during discharge. The evolution of hydrogen during charging results in an efficient stirring of the electrolyte. The cell was charged with a constant current of 1.2A during 8 hours and discharge at 2 to 8 A. The total capacity of the zinc plates was 20 Ahr. Considering the 2 hour discharge rate, the cell capacity limited by the positive electrodes was 8Ahr; The discharge plateau was 1.6 V, the cell energy density was 60 Whr/kg. After 500 cycles, about 90 percent of the initial capacity of the cell remained.

EXAMPLE 2:

Cycling tests on Ni-Zn cells with and without an auxiliary electrode.

Two positive limiting Ni-Zn vented cells of rated capacity 8 Ahr (2 hr rate) were constructed, one with (see FIG. 1) and one without an auxiliary electrode. In each cell there were two nickel sintered 4 Ahr positive electrodes enclosed in state of the art dendrite resistant separators, three negatives (teflonized zinc oxide on a zinc preplated baseplate) and limited electrolyte (50 ml of lithiated 30% KOH). The total Zn was equivalent to 2½ stroke (20 Ahr) and the plate dimensions were 7 cm × 15 cm. The cell without auxiliary electrode weighed 210 g, and since it could deliver 8 Ahr at the 2 hr rate at an average voltage of 1.6V the observed energy density was 60 Whr/kg. Introduction of the auxiliary electrode increased the cell weight by 10 g to 220 g for an auxiliary of surface area 40 cm$^2$. Since the cell performance was otherwise unchanged, the cell energy density dropped by less than 4% to 58 Whr/kg.

The auxiliary, when shorted out to the negative with the cell otherwise on stand, could deliver up to 2A. Under normal conditions, however, the cells were pulse charged at the 8 hr rate, using constant current and a voltage limit of 2V. For an 8 Ahr cell, the maximum expected shape-change per cycle (10% of the capacity) would be 0.8 Ahr (as excess Zn). Accordingly the auxiliary was connected by a resistor to the negative such that the average corrosion current was 100 mA over the 8 hour charge period. For this sytem a resistor of 3 ohm proved suitable; the auxiliary maintaining a potential of about +300 mV with respect to the negative during charge. The cells were discharged at 4A to an end voltage of 1.4V; the auxiliary was disconnected on discharge and the cells were cycled automatically.

The effect of cycling on capacity for the two Ni-Zn cells is shown below for the aforementioned cycling regime:

| Number of Cycles | Capacity of 8 Ahr cell with auxiliary (Ahr) | Capacity of 8 Ahr cell without auxiliary (Ahr) |
| --- | --- | --- |
| 1 | 8.0 | 8.0 |
| 50 | 7.9 | 7.5 |
| 100 | 8.1 | 7.0 |
| 150 | 7.8 | 6.0 |
| 200 | 8.0 | 4.4 |
| 250 | 7.7 | 3.2 |
| 300 | 7.9 | 2.6 |
| 400 | 7.8 | discontinued |

The results indicate that the cell without the auxiliary shows drastic shape-change under this severe cycling mode and the capacity has fallen to near half its rated value by 200 cycles. This is typical of literature Ni-Zn. The cell fitted with the auxiliary, however, maintains its capacity level for at least 400 cycles. It was noticed that the cell without auxiliary soon developed heavy clusters of zinc, which grew and accumulated along the bottom and edges of the negatives. In the cell with the auxiliary the bottom and edges of the negatives remained clear.

EXAMPLE 3:

A cell incorporating a mesh-type auxiliary electrode placed between the positive and negative electrodes and insulated from them by a suitable microporous separator was constructed as follows:

The cell consisted of two negative zinc electrodes of the teflonized zinc oxide type and one positive nickel electrode of the sintered type. The plate dimensions were, length 8 cm, breadth 5 cm and thickness 1 mm. The positive capacity was 2 Ahr, that of the negatives 4 Ahr altogether, considering the 2 hr discharge rate. The positive electrode was placed between the negative electrode at a distance of 0.4 mm from them and interposed between the positive and negative on each side was an auxiliary electrode mesh enclosed in an insulating envelope of microporous polypropylene. The auxiliary consisted of an open (10-mesh) nickel-plated steel mesh with thin strands (0.1 mm diameter), suitably activated with a Co-Ni spinel electrocatalyst and slightly larger than the electrode dimensions (9 cm × 6 cm). The envelope was of laminated reinforced microporous polypropylene (pore size 0.1 micron, porosity 35%) of thickness 0.1 mm. The net weight of the auxiliaries and their envelopes was 5 g. The electrolyte consisted of 30% potassium hydroxide containing 1% lithium hydoxide and 10 ml of electrolyte was used. The entire inner space of the cell was 60 ml and its weight was 50 g. The cell was charged at a constant current of 600 mA over a 5 hour period to a voltage limit of 2V, the auxiliary was connected to the negative during this period by a current controlling device which maintained 10% of the total charge current. The cell was discharged (25° C.) at 1A to a final voltage of 1.2V and during this period the auxiliary was disconnected. The cell capacity, determined by the positive, was at this rate of discharge 2 Ahr, the voltage plateau was 1.55V and the energy density of the cell was 62 Whr/kg. After 300 cycles about 80% of the initial capacity remained. When the microporous envelopes to the auxiliaries were replaced by coarse pore polyamide (pellon) layers, the cell failed through dendritic shorting after 2 cycles.

EXAMPLE 4:

A cell of the silver-zinc type, incorporating an auxiliary electrode, according to the invention, placed close to the extremities of the plates (FIG. 1, FIG. 2) was constructed as follows:

The cell consisted of two negative zinc electrodes of the teflonized zinc oxide type (1 mm thickness) and one positive silver electrode of the pasted silver oxide type (0.5 mm thickness). The plate linear dimensions were length 8 cm. breadth 5 cm. The positive capacity was 4Ahr, that of the negatives 6 Ahr altogther, considering the 1 hour discharge rate. The positive was enclosed by a state of the art dendrite resistant separator and was spaced 0.4 mm apart from the negatives. The electrolyte consisted of 40% potassium hydroxide and a quantity of 12 ml of electrolyte was used. The entire inner space of the cell was 25 ml; the cell weight was 50g. The auxiliary electrode consisted of a sandwich of porous nickel containing iron carbide powder at a loading of 20 mg/cm$^2$ in the form of a U-shaped structure, with a further similar rectangular section. The U-shaped part was positioned tangential to the lower and side sections of the cell electrodes, the rectangular one close to the upper part of the electrodes. The auxiliary electrode was at a distance of about 3 mm from the said edges of the electrodes of the cell, suitably insulated from them by an open nylon mesh (10 mesh size, strand diameter 0.1 mm). The total area of the zinc electrodes was 80 cm$^2$, the area of the auxiliary was 7 cm$^2$; the auxiliary weighed 2 g. The cell was charged at a constant current of 1A over a 5 hour period to a voltage limit of 1.95V. During this period the auxiliary was connected to the negative by a current controlling device which maintained 5% of the total charge current, this fraction being adequate to eliminate shape-change buildup in this silver-zinc cell. The cell was discharged (25° C.) at 4A to a final voltage of 1.3V, and during this period the auxiliary was disconnected. The cell capacity, determined by the positive, was at this rate of discharge 4 Ahr, the average voltage on discharge 1.5V and the energy density of the cell 120 Whr/kg. After 350 cycles about 75% of the original cell capacity remained.

EXAMPLE 5:

Results similar to those of Example 4 were obtained with the same arrangement, but with an auxiliary electrode of identical shape, made of nickel-plated steel activated with Co/Fe spinel.

We claim

1. A secondary cell comprising zinc electrodes and an auxiliary electrode having a surface of an electrocatalyst having a low overvoltage for hydrogen evolution which is resistant to deposition of zinc thereon, and means for connecting said auxiliary electrode to the negative electrodes during charging, said auxiliary electrode acting to take up the excessive current at the negative electrodes over that of the positive electrodes during charging thus eliminating or substantially reducing the shape-change phenomena of the negative electrodes.

2. A secondary cell according to claim 1, wherein the cell is selected from the group consisting of a Ni-Zn, a Ag-Zn, a $MnO_2$-Zn, a Zn-$O_2$ and a Zn-air cell.

3. A secondary cell according to claim 1, wherein the arrangement is such that the auxiliary electrode takes up about 5 to 10 percent of the current during the charging of the cell.

4. A secondary cell according to claim 1, wherein the auxiliary electrode is U-shaped and is arranged in the vicinity of the edges of three sides of the plates of the cell, at a selected distance from the sides and perpendicular to the surface of the plates.

5. A secondary cell according to claim 4, wherein there is provided a rectangular further auxiliary electrode in the vicinity of the fourth side of the plates of the cell and perpendicular thereto.

6. A secondary cell according to claim 1, wherein the auxiliary electrode is in the form of a coarse mesh carrying the electrocatalyst ensheathed in a microporous envelope, said auxiliary electrode being interposed between the plates of the cell.

7. A secondary cell according to claim 1, wherein the cell is of the minimum electrolyte type having a teflonized ZnO electrode.

8. A secondary cell according to claim 1, wherein means are provided for disconnecting the auxiliary electrode during storage and discharge.

9. A secondary cell according to claim 1, wherein the electrocatalytically active surface is selected from the group consisting of nickel boride and activated metal spinel oxide.

10. A secondary cell according to claim 9, wherein the activated metal spinel oxide is prepared from a Ni/Co alloy of 1:2 molar ratio.

11. A Ni-Zn cell of the minimum electrolyte type comprising teflonized - ZnO electrodes and a U-shaped electrocatalytically active auxiliary electrode in the shape of a bent-over ribbon of suitable catalytically active surface positioned adjacent to the edges of the lower ends of the plates of the cell and their lateral sides and a further rectangular member of similar material to the auxiliary electrode adjacent to the upper edges of the plates of the cell, said auxiliary electrode being separated from the edges of the plates by a suitable pervious insulator, said auxiliary electrode being adapted to be connected with the zinc plates during charging, the arrangement being such that the auxiliary electrode takes up about 5 to 10 percent of the current during charging.

* * * * *